Jan. 16, 1934.    R. TRUBERT    1,943,705
AUTOMATIC MIXER FOR HOT AND COLD WATER
Filed Aug. 31, 1932
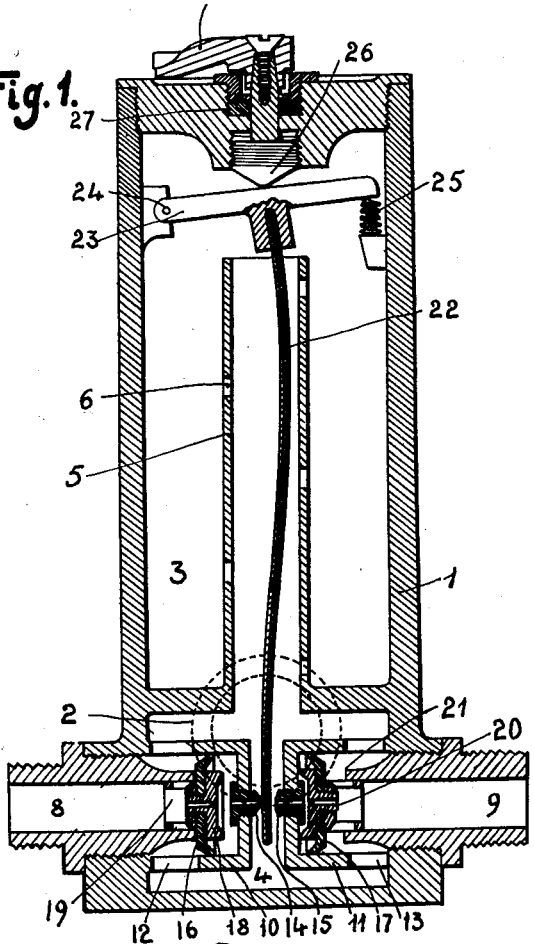
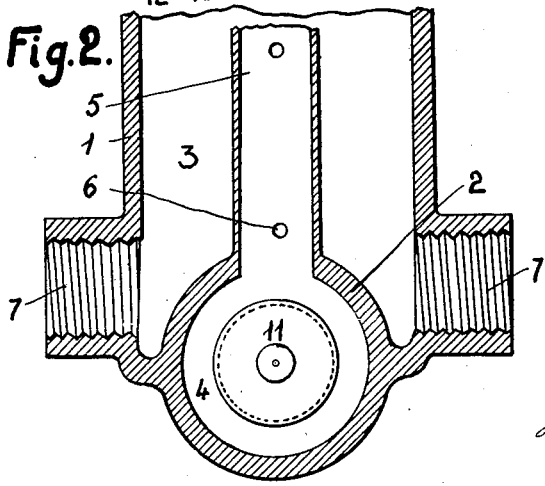
Inventor
Rene Trubert
by W. H. Blake
Attorney.

Patented Jan. 16, 1934

1,943,705

UNITED STATES PATENT OFFICE 1,943,705

AUTOMATIC MIXER FOR HOT AND COLD WATER

René Trubert, Arras, Pas-de-Calais, France

Application August 31, 1932, Serial No. 631,218, and in France September 16, 1931

8 Claims. (Cl. 236—12)

This invention relates to an automatic hot and cold water mixer more particularly but not exclusively, applicable to sanitary installations such as for example baths, shower baths, hairdressers' douches, lavatories, and so forth.

The known mixers are essentially provided with a hollow member into which lead, with the interposition of taps, the pipes for the hot and cold water and from which passes or pass the outflow pipe or pipes for the mixed water. In order to obtain water of a definite temperature the user must operate the hot and cold water taps simultaneously so as to adjust the ratio of their opening. This adjustment which is delicate and tedious is the first disadvantage of this system. Moreover as in practice the temperature and pressure of hot water vary practically continuously the adjustment which has been made soon becomes defective by reason of these variations and it is necessary to repeat the adjustments whilst in the interim between these adjustments the change in temperature of the mixture of water which occurs acts deleteriously on the user particularly in the case of shower baths.

The automatic mixer according to the present invention remedies these defects. For this purpose it is sufficient to set the adjusting handle opposite the figure corresponding to the required temperature so as to obtain constantly a mixture having a constant temperature.

Automatic mixers have already been suggested but these apparatus are delicate and expensive and their operation is defective. This, however, does not apply to the mixer according to the present invention by reason of the fact of the features thereof which will appear from the following description referring to the accompanying diagrammatic drawing which illustrates, solely by way of example, one form of construction of the invention.

Fig. 1 is an axial section of the apparatus, according to the invention, through the hot and cold water inlets, whilst Fig. 2 is an axial section of the apparatus at right angles to that of Fig. 1. Moreover in Fig. 2 the bimetal strip and its supporting and adjusting members have been omitted for simplifying the drawing.

The interior of the body 1 of the mixer is divided by a partition 2 into two compartments 3 and 4 communicating with one another by means of a tube 5 provided with holes 6. From the lower compartment 3 there extend the pipes 7 for the mixed water, whilst the inlet pipes 8 and 9 for the hot and cold water are fitted into caps 10 and 11 provided in the compartment 4. The lower portions of these caps 10 and 11 communicate with the compartment 4 through large apertures 12 and 13 and their upper portions are cylindrical and closed and are each only provided with one orifice located in the base thereof and provided with a nozzle 14 and 15. In the cylindrical portions of the caps 10 and 11 may move pistons 16 and 17 formed by a cupped washer of leather, rubber or other suitable material, clamped between a circular member 18, having a screw threaded portion and a nut 19 screwed on the screw threaded portion.

This nut 19 is extended by a guide tail which enters the inlet pipes 8 and 9 for the hot and cold water. These are terminated in seats 21 against which the pistons 16 and 17 can bear in the manner of a valve and thus close the water inlets.

The member 18 is drilled with a calibrated hole 20 whilst between the nozzles 14 and 15 is located a bimetal strip 22 capable, according to its position, of closing one of the said nozzles 14 and 15. This bimetal strip 22 is secured to a member 23 rocking about an axis 24 and forced in one direction by a spring 25 and in the other direction by a screw 26 passing through a gland 27 and secured to a lever 28 moving in front of graduations.

The operation of the mixer according to the invention is as follows:

When a user is using mixed water a supply of hot water takes place at 8 and a supply of cold water at 9 and the whole is mixed together in the tube 5 flowing over the bimetal strip 22. Assuming that the temperature of the water thus mixed is too cold the bimetal strip 22 is deformed and closes the nozzle 15, the cold water passing through the calibrated orifice 20 being no longer able to escape through the nozzle 15 acts on the piston 17 thus pressing this against its seat 21 and closing the inlet for cold water. If on the contrary the temperature of the water had been too high the reverse operation would have been produced, that is to say, the hot water inlet would have been closed.

It will thus be seen that the mixed water is maintained at a constant temperature, which temperature may be varied by operating the lever 28 as a result of which the screw 26 is turned and consequently the member 23 and the bimetal strip 22 are moved.

It may be mentioned that the water inlets are opened automatically by reason of the fact that the orifices 20 being calibrated only allow a minimum quantity of water to pass therethrough which immediately flows through the orifice 14 or 15 of larger area. Consequently no pressure is established in the cylindrical portions of the caps 10 and 11 and the pistons 16 and 17 are forced away from their seats 21.

If on the contrary the bimetal strip 22 closes one of the nozzles 14 or 15 (which closure need not be hermetic, it being sufficient for the area of the nozzle to be reduced to a value below that of the calibrated orifice 20) the pressure produced in the cylindrical portion of the corresponding cap pushes back the corresponding piston and closes the water inlet wth a force equal to the pressure of the incoming water multiplied by the difference in the areas of the cylindrical portion of the cap and the water inlet. It will be noted that the movement of the piston is deadened by the drop in pressure produced by the flow of water between the seats 21 and the corresponding piston. In cases where the bimetal strip partially approaches one of the nozzles the corresponding water inlet is partially closed.

From the foregoing it will be seen that one of the advantages of the mixer according to the invention is that the bimetal strip which adjusts the temperature of the mixed water does not develop any considerable force which enables a thin, economical and very sensitive bimetal strip to be used.

Closing valves may be provided in the hot and cold water supply pipes, but these valves are not generally necessary as in practice, should the mixer not operate, hot water cannot pass into the cold water pipes or vice versa, by reason of the fact that if this were the case the bimetal strip would be brought to such a high or low temperature as to close the corresponding water inlet.

The object of the tube 5, holes 6 and compartment 3 is to thoroughly mix the hot water with the cold water, particularly in the case where pulsations are produced and which are caused by the bimetal strip which successively allows small quantities of hot water and then small quantities of cold water to pass. These pulsations of very short duration are no longer felt at the outlets 7 for the mixed water.

The foregoing description has been given solely by way of example, consequently the mixer can be constructed differently without departing from the limits of the invention. Thus for example piston 17 may be replaced by diaphragms secured in the caps 10 and 11 and adapted to cooperate with the seats 21, whilst a small central calibrated orifice provided in these diaphragms places the water inlets into communication with the cylindrical portion of the said caps. It is unnecessary to describe the operation of this device which is the same as that above described. The deformations of the diaphragms replace the movements of the pistons.

I claim

1. An automatic mixer for hot and cold water comprising a mixing chamber, a hot water inlet nozzle, a cold water inlet nozzle, a bimetal strip mounted in said chamber between said nozzles, said strip cooperating with said nozzles so as to control the passage of water therethrough, a pivotally mounted lever to which said strip is secured, and means for discharging a mixture of hot and cold water from said chamber.

2. An automatic mixer for hot and cold water comprising a mixing chamber, a hot water inlet nozzle, a cold water inlet nozzle, a bimetal strip mounted in said chamber between said nozzles, said strip cooperating with said nozzles so as to control the passage of water therethrough, a pivotally mounted lever to which said strip is secured, a spring acting on one side of said lever, an adjusting screw acting on the other side of said lever, and means for discharging a mixture of hot and cold water from said chamber.

3. An automatic mixer for hot and cold water comprising a mixing chamber, a hot water inlet nozzle, a cold water inlet nozzle, a bimetal strip mounted in said chamber between said nozzles, said strip cooperating with said nozzles so as to control the passage of water therethrough, a lever having said strip secured to the middle thereof, said lever being pivotally mounted at one end in said chamber, a spring bearing against the other end of said lever and adapted to force said lever in one direction, a screw adjustably mounted in said chamber and bearing against said lever in an opposite direction to said spring, a handle on said screw, graduations on said chamber with which said handle cooperates, and means for discharging a mixture of hot and cold water from said chamber.

4. An automatic mixer for hot and cold water comprising a mixing chamber, a hot water inlet nozzle, a cold water inlet nozzle, a bimetal strip mounted in said chamber between said nozzles, said strip cooperating with said nozzles so as to control the passage of water therethrough, inlet pipes leading into said chamber adjacent said nozzles, piston cylinders communicating with said inlet pipes and carrying said nozzles, pistons arranged one in each of said cylinders, and means for discharging a mixture of hot and cold water from said chamber.

5. An automatic mixer for hot and cold water comprising a mixing chamber, a hot water inlet nozzle, a cold water inlet nozzle, a bimetal strip mounted in said chamber between said nozzles, said strip cooperating with said nozzles so as to control the passage of water therethrough, inlet pipes leading into said chamber adjacent said nozzles, cylinders communicating with said inlet pipes and carrying said nozzles, pistons arranged one within each cylinder, said pistons being constructed as valves, seats in said cylinders for said pistons, said pistons having calibrated holes therein, said pistons being so arranged that when the pressure is applied on one of the faces thereof by reason of the difference in pressure between the water passing through a calibrated hole and the water passing through a nozzle of which the area is controlled by the strip, the corresponding piston is forced against its seat, and means for discharging a mixture of hot and cold water from said chamber.

6. An automatic mixer for hot and cold water comprising a mixing chamber, a hot water inlet nozzle, a cold water inlet nozzle, a bimetal strip mounted in said chamber between said nozzles, said strip cooperating with said nozzles so as to control the passage of water therethrough, inlet pipes leading into said chamber adjacent said nozzles, cylinders communicating with said pipes and carrying said nozzles, flexible diaphragms in said cylinders, each of said diaphragms having a calibrated hole therein, said diaphragms being adapted to cooperate with said inlet pipes, by means of one of their surfaces, whilst the other surface which is of larger diameter is subjected to the pressure of water in a space communicating with the corresponding inlet pipe through said calibrated hole and with the chamber through one of said nozzles, and means for discharging a mixture of hot and cold water from said chamber.

7. An automatic mixer for hot and cold water comprising a mixing chamber, a hot water inlet nozzle, a cold water inlet nozzle, a bimetal strip mounted in said chamber between said nozzles, said strip cooperating with said nozzles so as to control the passage of water therethrough, a perforated tube in said chamber, said perforated tube enclosing said strip and communicating with said nozzles, and outflow means for the mixture of hot and cold water.

8. An automatic mixer for hot and cold water comprising a chamber, a partition in said chamber dividing said chamber into two compartments, inlet pipes for hot and cold water communicating with one of said compartments, outlet pipes communicating with the other compartment, an upstanding perforated pipe extending upwardly from said partition, a pair of cylinders associated one with each inlet pipe, valve seats on said inlet pipes, a pair of nozzles mounted one in each cylinder, a pair of pistons mounted one in each cylinder, each of said pistons being arranged between its corresponding seat and nozzle, each of said pistons consisting of a cupped resilient washer, a circular member having a screw threaded portion and a calibrated hole therein, and a nut engaging said screw threaded portion, the washer being clamped between said circular member and said nut, a lever pivotally mounted at one end in said chamber, a bimetal strip secured to said lever, said strip extending through said perforated pipe and between said nozzles so as to cooperate with the latter, a spring acting on the other end of said lever so as normally to press said end upwardly, a cover on said chamber, a screw adjustably fitted in said cover and bearing on said lever, a lever on said screw, and graduations on said cover with which said lever cooperates.

RENÉ TRUBERT.